(12) United States Patent
Rossetti et al.

(10) Patent No.: US 6,467,723 B1
(45) Date of Patent: Oct. 22, 2002

(54) ACTIVE VIBRATION CONTROL SYSTEM FOR HELICOPTER WITH IMPROVED ACTUSTOR PLACEMENT

(75) Inventors: Dino J. Rossetti, Raleigh, NC (US); Mark A. Norris, Apex, NC (US); Guy D. Billoud, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/686,009

(22) Filed: Oct. 10, 2000

(51) Int. Cl.[7] .............................................. B64D 47/00
(52) U.S. Cl. ................. 244/17.11; 244/1 N; 244/17.27; 381/71.4
(58) Field of Search .............................. 244/1 N, 17.27, 244/17.13, 17.11; 181/33; 188/378; 416/500; 381/71.4, 71.9, 71.12

(56) References Cited

U.S. PATENT DOCUMENTS

| | | | |
|---|---|---|---|
| 3,635,427 A | 1/1972 | Balke | 244/17.27 |
| 3,845,917 A | 11/1974 | Drees | 244/17.27 |
| 3,938,762 A | 2/1976 | Murphy | 244/17.13 |
| 3,954,229 A | 5/1976 | Wilson | 244/17.13 |
| 4,212,588 A | 7/1980 | Fradenburgh | 416/141 |
| 4,470,121 A * | 9/1984 | Ebert | 416/500 |
| 4,715,559 A | 12/1987 | Fuller | 244/1 N |
| 4,819,182 A | 4/1989 | King et al. | 364/508 |
| 5,118,051 A * | 6/1992 | Sheehy et al. | 244/17.27 |
| 5,228,640 A | 7/1993 | Mouille | 244/17.27 |
| 5,269,489 A | 12/1993 | West et al. | 248/550 |
| 5,310,137 A | 5/1994 | Yoerkie et al. | 244/17.27 |
| 5,526,292 A | 6/1996 | Hodgson et al. | 364/574 |
| 5,551,650 A | 9/1996 | Southward et al. | 244/54 |
| 5,620,068 A * | 4/1997 | Garnjost et al. | 188/378 |
| 5,732,905 A | 3/1998 | Krysinski | 244/17.27 |
| 5,802,184 A | 9/1998 | Heath | 381/71.4 |
| 5,845,236 A | 12/1998 | Jolly et al. | 702/195 |
| 5,853,144 A | 12/1998 | Vincent | 244/17.13 |
| 5,895,012 A | 4/1999 | Krysinski et al. | 244/17.13 |
| 5,906,254 A | 5/1999 | Schmidt et al. | 188/378 |
| 5,954,169 A | 9/1999 | Jensen | 188/378 |
| 6,002,778 A | 12/1999 | Rossetti et al. | 381/71.4 |
| 6,006,875 A * | 12/1999 | Van Namen | 188/378 |
| 6,009,985 A * | 1/2000 | Ivers | 188/380 |
| 6,045,090 A | 4/2000 | Krysinky et al. | 244/17.27 |
| 6,067,853 A * | 5/2000 | Thevenot | 73/178 H |
| 6,279,704 B1 * | 8/2001 | Manfredotti | 188/378 |

OTHER PUBLICATIONS

Lord Corporation—Library of Technical Articles, "A Demonstration of Active Control for Helicopter Cabin Noise Reduction," Jolly et al., LL–6503, pp. 8–1—8–14.
Lord Corporation—Library of Technical Articles, "Passive, Active, and Hybrid Solutions for Aircraft Interior Noise Problems," Miller et al., LL–6007, Nov. 1995.

* cited by examiner

Primary Examiner—Galen L. Barefoot
(74) Attorney, Agent, or Firm—Michael M. Gnibus (57) ABSTRACT

An aircraft has a fuselage that defines an interior cabin and an exterior; a first housing located along one side of the fuselage exterior; a second housing located along the second side of the fuselage exterior; and an active vibration control system for limiting fuselage vibration, the vibration control system comprising a plurality of sensors located in the cabin; a controller in signal receiving relation with the sensor means; first actuator means located in the first housing and second actuator means located in the second housing and wherein the actuator means are in signal receiving relation with the controller.

16 Claims, 6 Drawing Sheets

ACTIVE VIBRATION CONTROL SYSTEM FOR HELICOPTER WITH IMPROVED ACTUSTOR PLACEMENT

FIELD OF THE INVENTION

The invention relates to an active vibration control system, and more particularly the invention relates to an active vibration control system for reducing fuselage vibration in a helicopter where the active control system actuators are optimally located in housings made integral with the exterior of the helicopter fuselage.

BACKGROUND OF THE INVENTION

During helicopter operation, vibratory disturbances are transmitted from the rotor to the helicopter fuselage structure. The vibration is a source of irritation and discomfort to the passengers seated in the helicopter passenger compartment and as reflected in the related prior art, in an effort to improve passenger comfort and pilot performance, numerous approaches to controlling fuselage vibration in helicopter fuselages have been developed. Generally the proposed prior art approaches to limiting helicopter fuselage vibration can generally be divided into two separate technical classes: those that attempt to isolate the rotor vibratory disturbances from the fuselage and those that treat the vibration on the fuselage structure itself. Within the latter class, there are two approaches: those that relate to techniques for integrating passive tuned vibration absorbers (TVAs) with the fuselage, and those related to the use of active vibration control systems (AVCs) integrated with the fuselage structure. TVAs and AVCs control structural vibration in the fuselage structure and in the passenger compartment.

Specifically, TVAs are comprised of a low frequency, flexible suspended tuning mass that is tuned by adjusting either the stiffness of the mass' associated flexible suspension or the actual mass of the TVA. The TVA mass is sized, shaped and suspended in the manner required to reduce the magnitude of the vibration in the fuselage. Effective performance of the TVA is limited to a narrow range of frequencies and therefore one or more additional TVAs would be needed if vibration reduction is required for one or more other frequency range(s).

Although TVAs are effective for reducing vibration in certain environments and applications, prior art TVAs are not the best suited and most effective means for limiting vibration in a helicopter fuselage for a number of reasons. First, by their design and method of operation, the performance of a TVA is directly proportional to its weight. Therefore, when the TVA is adapted for use in a helicopter or other aircraft, in order to effectively damp the vibratory disturbances, the TVA weight can become quite significant, for example the weight of a single TVA for use in a helicopter can exceed one hundred (100) pounds for certain applications. Second, prior art TVAs can only offer localized vibration reduction at and near the point of attachment between the tuning mass and fuselage. Therefore, if it is necessary to control vibration at a number of locations along the fuselage a number of heavy, passive vibration absorption units might be required. In a helicopter application where minimizing helicopter weight is critical, the additional significant weight associated with one or more TVAs makes TVAs an unappealing approach to limiting helicopter fuselage vibration and problems.

Active Vibration Control (AVC) systems consist of one or more actuators intelligently driven by an electronics unit connected to vibration sensors located throughout the aircraft. The actuators are driven or vibrated at one or more frequencies that are harmonics of the main rotor speed. AVC systems overcome the shortcomings of TVAs in at least two ways. First, performance of an AVC system is not a direct function of the actuator weight. Rather, the performance of the AVC system is a function of both the location and operation of the actuators. Thus, an AVC system typically weighs considerably less than a TVA designed to perform the same vibration control function. Second, an AVC system can be designed to globally control vibration throughout the fuselage. Multiple TVAs are often required to control fuselage vibration in the entire cabin. Thus an AVC system offers performance that is considerably more global than a TVA. An AVC system could have fewer actuators than a TVA system and still be able to control vibration in substantially the entire cabin. An AVC can control noise and vibration at multiple frequencies simultaneously whereas a TVA can only control vibration at a single frequency.

The performance of any AVC system is highly dependent on the location of the actuators in the helicopter. Therefore it is critical that the actuators be coupled to the fuselage where they are most likely to globally affect vibration and limit the effects of the vibratory disturbances on the helicopter fuselage. In the relevant prior art, little has been disclosed regarding optimal placement of the actuators on helicopters. Actuator placement critically influences the effectiveness of the AVC system in at least two ways. First, the global and local vibrations are strongly influenced by actuator placement. Second, actuator placement dictates the amount of force that the actuators must produce to limit the structural vibration, and the greater the required force, the larger and heavier the actuator mass must be to minimize the vibration.

The prior art illustrates active vibration control systems with sensors located in many different locations in the cabin. Frequently helicopter actuators are comprised of hydraulic actuators located in the struts between the rotor transmission pylon and the fuselage. Locating the actuators between the pylon and fuselage is feasible for new aircraft where the actuators can be designed into the struts during the overall aircraft design. However, the actuators cannot be easily retrofitted into existing helicopters. The prior art also discloses AVC systems that use hydraulic inertial actuators made integral with the fuselage along the interior cabin roof. Locating actuators in this manner provides acceptable vibration reduction however the forces required to achieve good performance are high resulting in larger than desired actuators.

The foregoing illustrates limitations known to exist in present passive and active helicopter vibration control systems and methods. Thus, it is apparent that it would be advantageous to provide a suitable active vibration control system for a helicopter that is easily retrofittable on existing helicopters and also provides acceptable reduction of fuselage vibration by applying low forces using actuators that do not add significant weight to the helicopter, and are located at optimal locations along the helicopter fuselage. Accordingly, a suitable alternative is provided including features more fully disclosed hereinafter.

SUMMARY OF THE INVENTION

In light of the current state of the art, this is accomplished by the present invention which is an AVC system for helicopters with optimal actuator placement in housings made integral with the helicopter fuselage on opposite sides of the exterior helicopter fuselage.

The helicopter includes a fuselage that defines an interior cabin and a fuselage exterior. At least one housing is located along the exterior of the fuselage. The active vibration control system for limiting fuselage vibration includes sensor means for sensing the fuselage vibration; controller means in signal receiving relation with the sensor means; and actuator means located in the at least one housing. The actuator means is in signal receiving relation with the controller means.

The housing locations are optimal with respect to maximizing performance, minimizing force requirements and minimizing installation difficulty. These optimal locations were discovered through extensive vibration testing and analysis. By locating the housings along the fuselage exterior, the housings are readily accessible to a technician installing or repairing the actuator or system.

The foregoing and other aspects will become apparent from the following detailed description of the invention when considered in conjunction with the accompanying drawing figures.

BRIEF DESCRIPTION OF THE DRAWING FIGURES

FIG. 3b is a front view partially broken away showing the housing and actuator of FIG. 3a;

FIG. 4b is a side view of the actuator of FIG. 4a; and

DETAILED DESCRIPTION OF THE INVENTION

Figure 1:
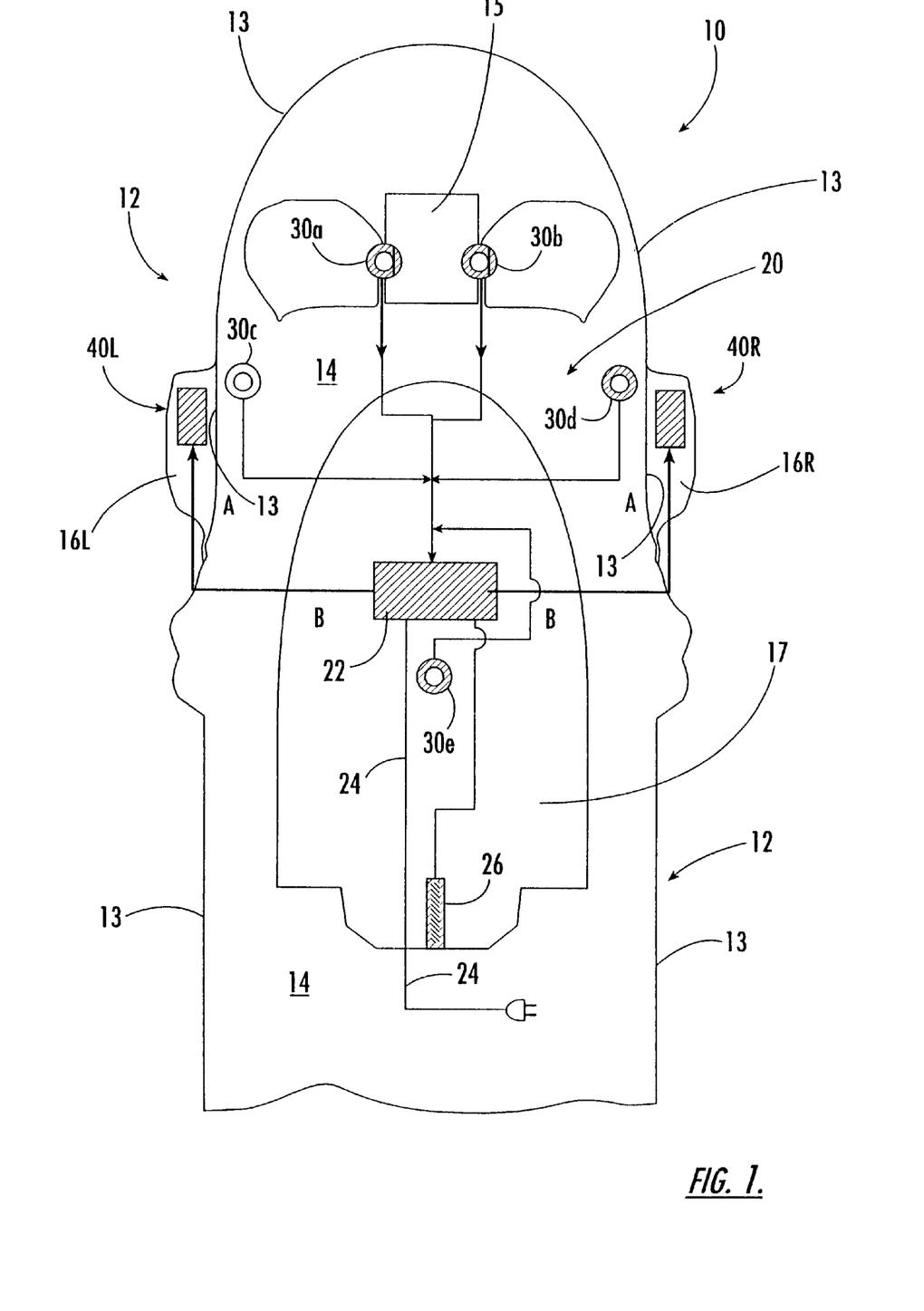
FIG. 1 is a schematic representation of a helicopter that includes the active vibration control system of the present invention including the actuators located in housings along the exterior of the fuselage.

Turning to the drawings, FIG. 1 is a schematic representation of a portion of a conventional helicopter 10 which includes active vibration control system (AVC) 20 of the present invention. Helicopter fuselage 12 defines exterior fuselage portion 13 and also defines interior compartment 14 which includes cockpit and cabin sections 15 and 17 respectively. The cabin is a conventional cabin and although it is not shown in the schematic depiction of the helicopter in FIG. 1, the cabin also includes an aft cabin section. The fuselage supports a conventional helicopter rotor (not shown) located above mid cabin section 17. Rotation of the rotor produces vibratory disturbances that are transmitted to the fuselage. The fuselage vibration is reduced by the active vibration control system 20 of the present invention.

The conventional rotor spins or rotates at a constant frequency. For purpose of describing the invention it is assumed that the conventional rotor rotates at a frequency, 1 P, of 4.3 Hz, and the rotor includes four blades so that the blade passage frequency may be characterized as 4 P, or 17.2 Hz. It should be understood that the AVC system of the present invention may be used to control vibration at other characteristic frequencies related to the rotor. In addition to the four-bladed rotor described herein, the system 20 may also be used in combination with a two, three, five or six bladed rotor. The system 20 may also be used to control vibration at 8 P or eight cycles per revolution, or at higher frequencies if required. Because the actuators are of a voice coil design they can create forces at multiple frequencies Housings 16R and 16L are made integral with the exterior sides 13 of the fuselage 12. As generally represented in FIG. 1 for purposes of describing the preferred embodiment of the invention the housings 16R and 16L comprise stub wings or landing gear fairings. The stub wings are located adjacent the landing gear wheels (not shown) and are located behind the cockpit and cabin sections 15 and 17. Generally, the structures 16R and 16L reduce the drag produced by substructures such as the landing gear.

The active vibration control system 20 of the present invention is generally comprised of actuators 40R and 40L, an electronic control unit 22 and a plurality of sensors 30a, 30b, 30c, 30d and 30e.

The electronic control unit (ECU) is of conventional design and serves as a controller for system 20. The ECU is comprised of a processor and supporting circuitry and the ECU also includes a power amplifier (not shown) that amplifies the control signal transmitted by the controller to the system actuators 40L and 40R. The controller is powered by one of the helicopter's electrical buses in a conventional manner through power cable 24 or other conventional means. The electronic controller is of conventional design well known to one skilled in the art.

Magnetic pickup 26 is positioned proximate the rotor shaft and serves as a means for sensing the rotational speed of the rotor. The pickup is electrically connected to the controller in ECU 22 in signal transmitting relation with the controller. The voltage output of the pickup is directly transmitted to the controller. The magnetic pickup operates in a conventional manner well known to one skilled in the relevant art so that further detailed description of the operation of the pickup is not required.

Vibration sensors 30a, 30b, 30c, 30d and 30e are spaced apart in the cockpit and cabin sections of passenger cabin 14. The sensors are comprised of conventional accelerometers and serve to sense the resultant acceleration due primarily to the vibrations transmitted through the fuselage by the displacement of the helicopter rotor. Each sensor is electrically connected to controller 22 in signal transmitting relation to the controller. And all of the sensors are oriented to sense vertical vibration parallel to the axis of rotor rotation.

As shown in FIG. 1, sensors 30a–30e are distributed throughout the fuselage structure 12. Specifically, sensors 30a and 30b are located in the cockpit adjacent the pilot and co-pilot pedals. Sensors 30c and 30d are located near the pilot and co-pilot seats and sensor 30e is located in the fuselage floor structure. The sensors are mounted to the fuselage in a conventional manner using suitable fasteners and other hardware well known to one skilled in the art. The precise required location for each of the sensors is dependent on the vibration characteristics of the helicopter, the performance requirements for the system 20 (e.g. where vibration reduction is required) as well as practical requirements such as the ability to locate fasteners and wiring. The orientation and location of sensors 30a–e are shown and described in the foregoing configuration for purposes of describing the preferred embodiment of the invention, however it should be understood that any suitable number of sensors and configuration of the sensors may be utilized in the active vibration control system 20 of the present invention.

Actuators 40R and 40L are optimally located in housings 16R and 16L respectively as shown in FIG. 1. By locating the actuators 40L and 40R in the exterior housings 16L and 16R, system performance is maximized, the forces required to eliminate fuselage vibration are minimized, and the installation of the actuators in new and existing helicopters is greatly simplified.

However, establishing the optimal housing location required extensive testing and analysis on the part of the co-inventors. The optimal actuator locations were defined after extensive testing and analysis conducted by the co-inventors on an actual test helicopter over a one-year period. The present invention active vibration control system satisfies the long felt need to minimize fuselage vibration in aircraft. The active vibration control system of the present invention overcomes the shortcomings associated with prior art systems by providing a suitable active vibration control system for a helicopter that may be easily retrofitted on existing helicopters and also provides acceptable reduction of fuselage vibration by applying minimal force using actuators that do not add significant weight to the helicopter.

A number of tests were conducted to determine the optimum actuator location and for each test the standard flight conditions of 140 knots forward flight were used. Additionally, for each test, as expected the measured forces in the actuators were not the same and as a result, for each experiment a range of applied forces is provided. The minimal force value in the range represents the measured force in one actuator and the higher force value represents the measured force in the opposite actuator.

The initial test of active vibration control system 20 was conducted in June, 1999 and during the test the actuators were located in the cabin corner positions identified by each of the letters A in FIG. 1. During rotor operation, the acceleration level sensed by the accelerometers was 0.192 g when the system was not operating, and was 0.116 g when the system was operating. The actuator force required to reduce the vibration levels ranged between 150 and 350 pounds of force. In December, 1999 a second test was conducted with the actuators located in the cabin inward positions identified by both of letters B in FIG. 1. As shown in FIG. 1, the cabin inward positions are located near the front of the cabin section. During the second system test, the system effectiveness was reduced significantly as the vibration levels both with the system off and on rose, relative to the previous test, to 0.282 g and 0.149 g respectively and the force required to reduce the vibration levels also increased significantly to between 400 and 425 pounds of force. In April, 2000 a third test was conducted with the actuators again located in the cabin positions identified by the A's. The vibration level with the system off was recorded at 0.216 g, with the system on the vibration level was 0.076 g and the forces required ranged between 225 and 275 pounds of force. Finally in April, 2000 actuators were placed in the housings 16R and 16L. The vibration level with the system off was sensed at 0.216 g, the vibration level with the system on was sensed at 0.054 g, and the force required to minimize the vibration ranged between 125 and 200 pounds. After almost a year of experimentation and analysis, it was determined that the present actuator locations in housings 16R and 16L along the exterior of the fuselage and adjacent the fore section 15 are the optimal actuator locations for helicopter active vibration control.

Turning to FIGS. 3a–5, the actuators 40R and 40L will now be described. The actuators 40R and 40L are linear type actuators and the actuators are the same so that as the description proceeds and for clarity only actuator 40R will be described. However, the description of actuator 40R also applies to actuator 40L. Generally, the actuators produce a force that is proportional to the drive signal from the ECU. In the preferred embodiment the actuators are similar to traditional passive absorbers except that the actuators incorporate electromagnetic technology to provide a much better actuator force to weight ratio.

Figure 2A:
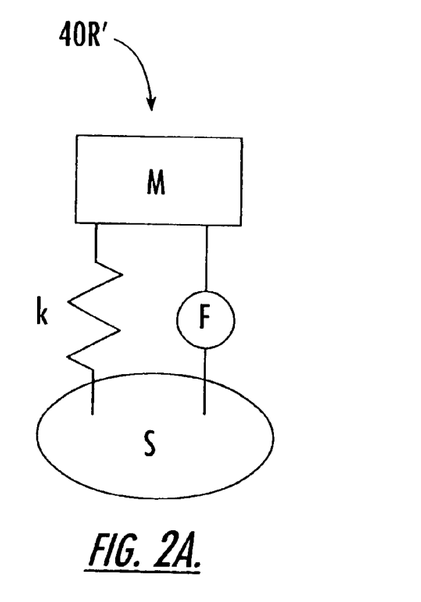
FIGS. 2a, 2b, and 2c are respectively schematic representations of first, second and third embodiment actuators which may be used in the active vibration control system of the present invention.
Figure 2B:
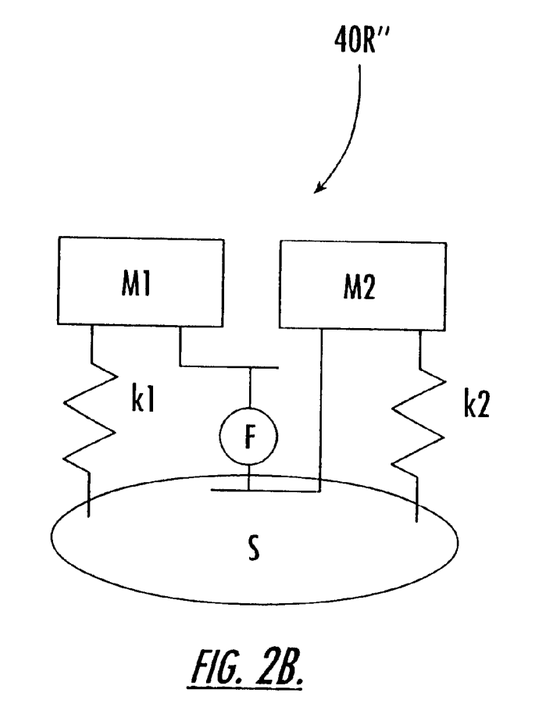

The actuators may take any type of suitable configuration. The schematic representations of three suitable actuators are shown in FIGS. 2A, 2B and 2C. The configuration shown in FIG. 2A and identified generally as 40R' is the simplest linear actuator configuration with mass M directly connected to the fuselage structure S by spring k. The mass is actuated by force means F which is an electromagnetic force by a coil of wire rigidly connected to structure S and a permanent magnet attached to mass M. The actuator 40R' is a linear actuator. Another embodiment linear actuator is identified as 40R" in FIG. 2B. The actuator of FIG. 2B is the preferred embodiment actuator for purposes of describing the present invention.

Figure 2C:
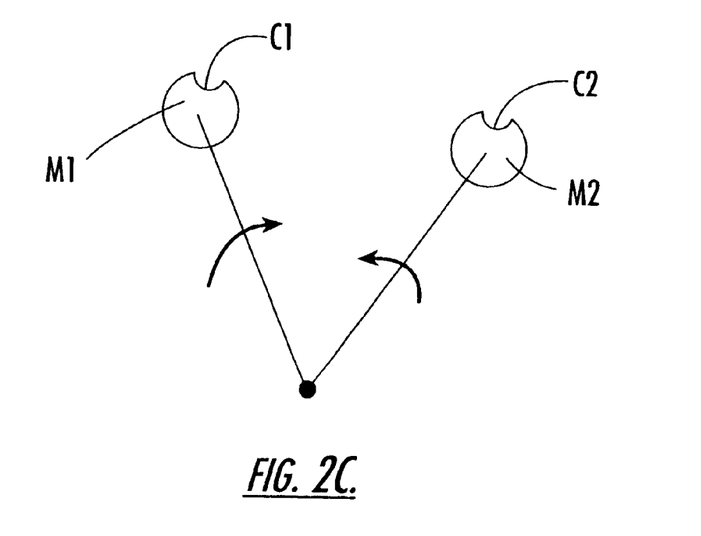

FIG. 2C schematically represents a conventional rotary actuator of the type well known to one skilled in the pertinent art. The actuator 40R''' includes masses M1 and M2 that are non-concentric eccentric masses and include respective cutout portions C1 and C2. Typically the rotary actuators include at least two non-concentric eccentric masses corotating at the angular speeds. The masses are displaced in parallel planes and pass each other to produce maximum unbalance. When the masses are opposed typically by 180° the actuators provide a minimum imbalance. Like the linear actuators, the rotary actuators oppose the propogation of vibration by controlling the angular positions of the masses to provide a pattern of inertial forces to oppose and cancel the transmission of vibration through the fuselage.

The preferred actuator configuration shown in FIG. 2B is comprised of a two degree of freedom system where masses M1 and M2 are connected to the stationary structure S through their respective springs k1 and k2. The masses are in turn actuated by an electromagnetic force F. The force F is directed laterally/radially and the flux interferes with or crosses the current through the coil which results in the axial displacements in direction 49.

The two mass configuration presents two different tuning frequencies and performance characteristics. Use of two actuation masses results in two resonant frequencies at which the actuator unit can be driven. Although the configuration of FIG. 2B has been identified as the optimal approach for actuators 40R and 40L of system 20, it should be understood that each application depends on the force requirements, operational frequencies, weight requirements and space envelopes available for the actuators.

Figure 4A:
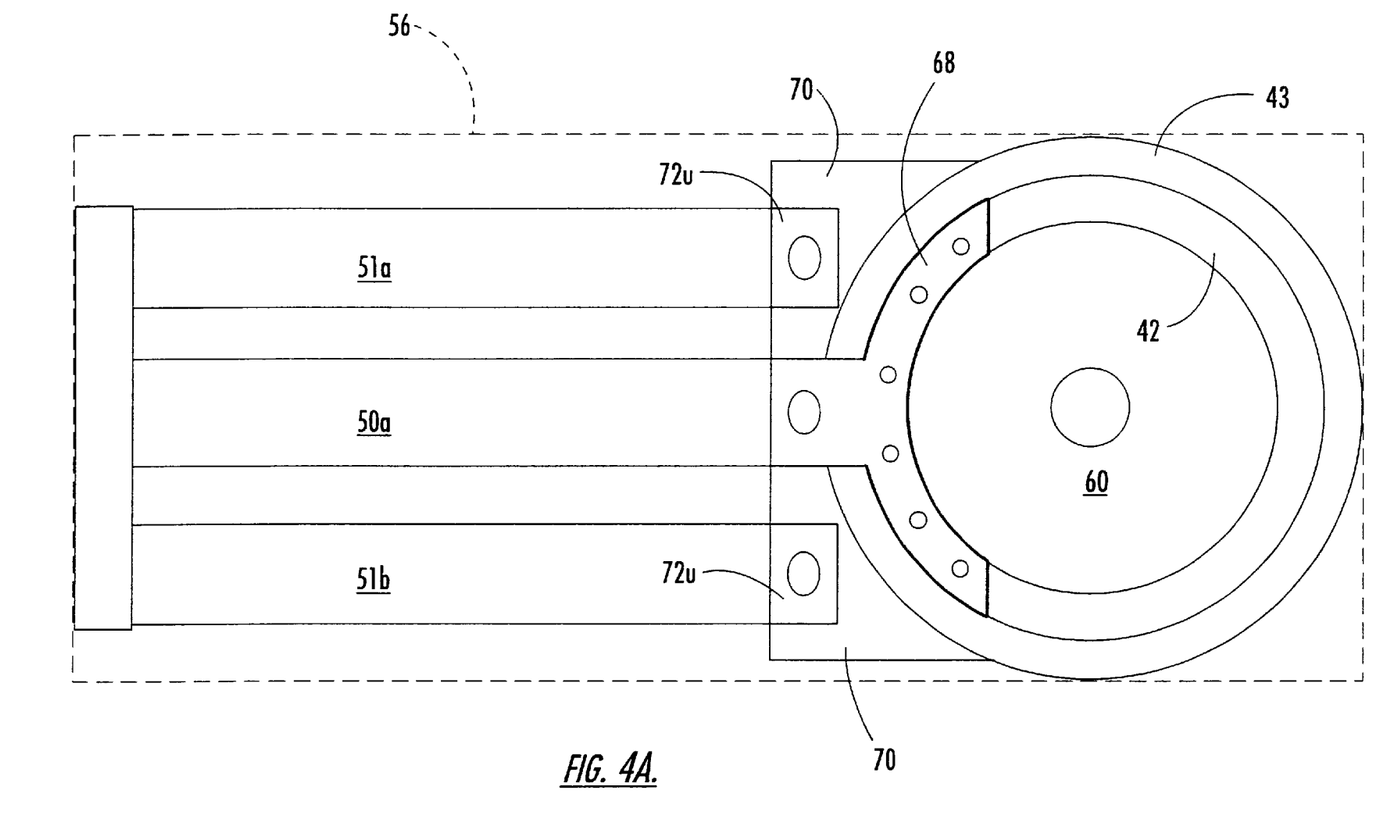
FIG. 4a is a top view of the actuator of FIG. 3a with the actuator housing removed.
Figure 4B:
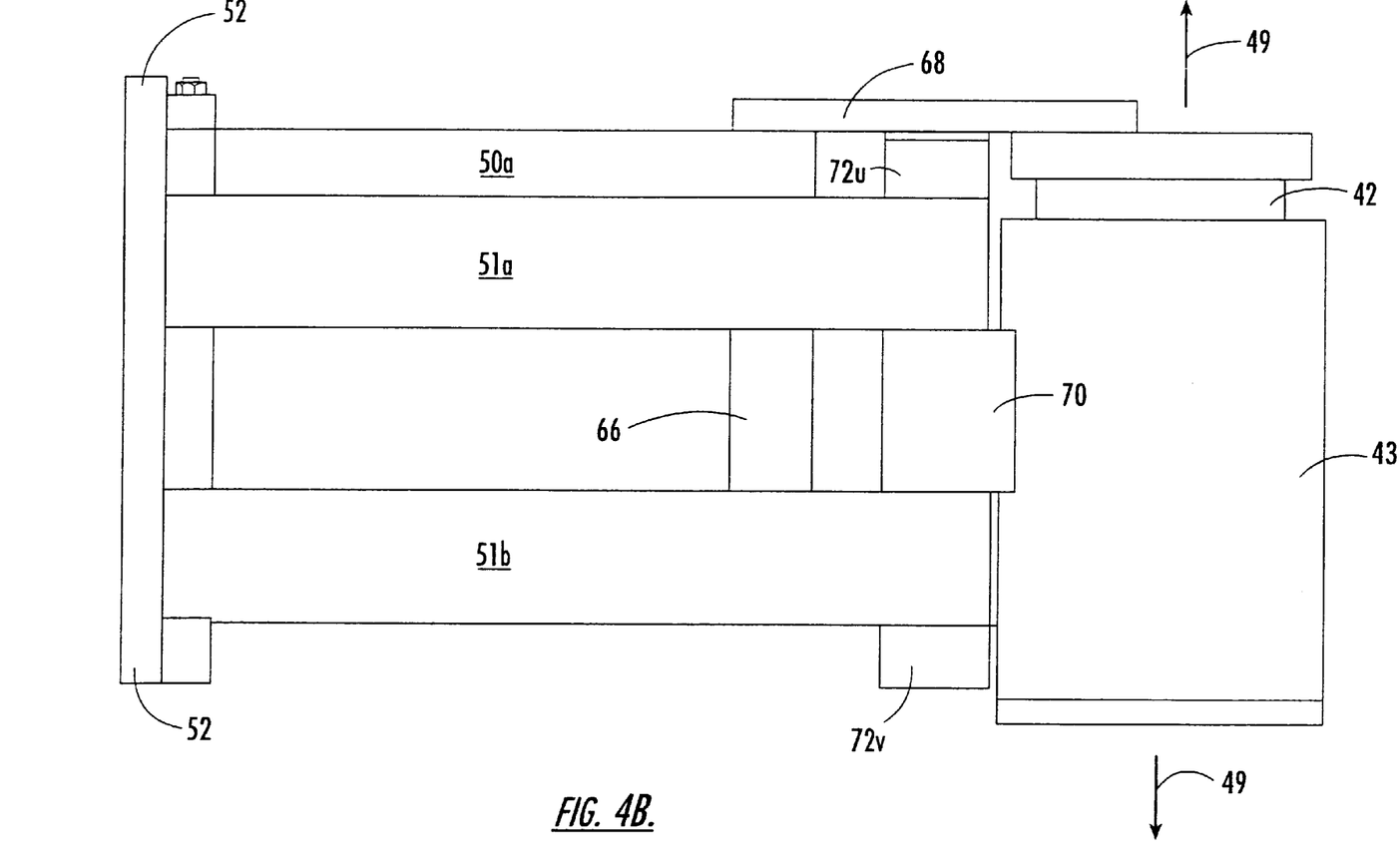
Figure 5:
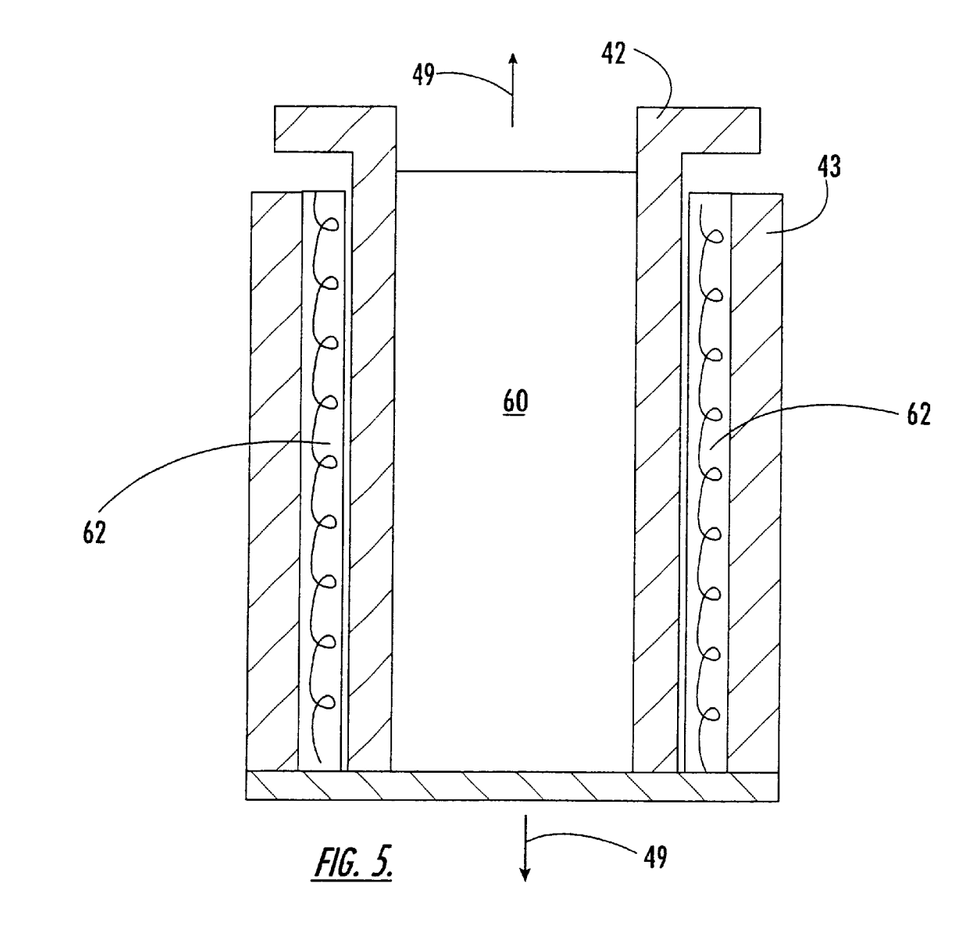
FIG. 5 is a sectional view of the actuator masses and magnet.

The actuator unit 40R is essentially two passive absorbers with the addition of an internal electromagnetic force generated between the two TVA masses. The sectional view of FIG. 5 is a more detailed representation of the actuator unit 40R represented schematically in FIG. 2P. The actuator is comprised of first and second hollow and substantially cylindrical masses 42 and 43 which are independently joined to housing base 52 by respective spring flexure members 50a and 50b and 51a and 51b. The springs provide the stiffness required such that mass 42 tends to resonate at 4P and mass 43 tends to resonate at 8P. In FIG. 4B, mass 42 includes a permanent magnet 60 surrounded by mass 42. Electromagnetic coil 62 is located between masses 42 and 43. When the controller supplies an electric current or signal to the coil 62 a magnetic field is produced and the field tends to cause the masses 42, 43 to resonate vertically in the directions identified by arrows 49 at the frequency required. Mass 43 includes bottom plate 64 fastened to the magnet 60 in a conventional manner.

The flexure members are comprised of a plurality of stacked leaf springs. Flexure member 50b is located below member 50a and is connected to flexure member 50a by rigid member 66. The flexure member 50a is connected to mass 42 by a rigid yoke member 68. Flexure members 51a and 51b are joined to rigid bracket 70 which in turn is connected to the outside of mass 43. Upper and lower rigid members 72U and 72L are connected to the outer surfaces of the flexure members 51a and 51b. The flexure members 51a and 51b and rigid members 70, 72U and 72L are connected by a conventional attachment member is passed through the flexure members and rigid members. Rigid members are also provided at the opposite end of the flexure members adjacent base 52. The base 52 is attached rigidly to the fuselage structure. The flexure members and actuator 40R are enclosed by actuator housing 56. As indicated above, the springs and masses of the unit are tuned to the harmonics of the normal operating frequency of the rotor which are attenuated by the AVC system 20. By operating the unit at resonance, a relatively small internal force can be leveraged to generate higher forces at the base 52. Without any electrical power and with the unit off, the unit behaves essentially like a passive absorber, which provides for graceful degradation in the case of power loss or electrical malfunction.

Figure 3A:
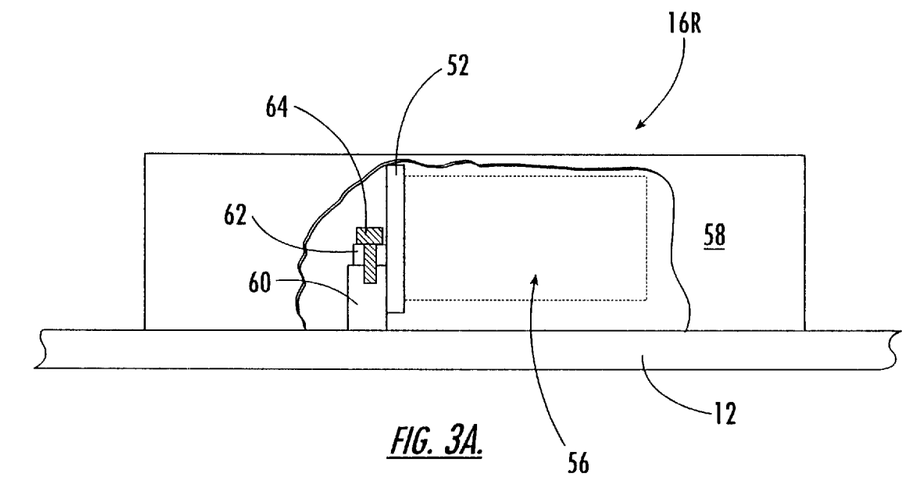
FIG. 3a is a top view of the housing and partially broken away to show the means for connecting the actuator to the fuselage.
Figure 3B:
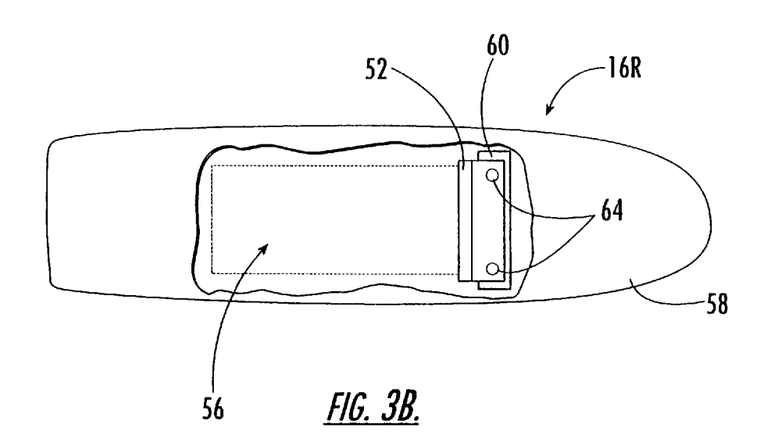

As shown in FIGS. 3A and 3B, the actuator 40R enclosed by housing 56 is located in the chamber 58 defined by fuselage 13 and housing 16R. A pedestal 60 is made integral with the fuselage at the required location along exterior fuselage 13, and a flange 62 made integral with base 52 is seated on top of the pedestal and the pedestal and flange are connected by two conventional fasteners 64. The pedestal 60 may be connected to the fuselage exterior 13 using any suitable well known means and the flange 62 and is generally incorporated directly into the base 52.

During flight, the actuators 40R and 40L are resonated at the frequency of the rotor for purposes of canceling the rotor induced fuselage vibration. The accelerometers 30a–30e continuously monitor the fuselage vibration and transmit the vibratory data to the controller 24. The controller, using a form of feed forward adaptive control algorithm or another suitable well known algorithm determines if a change in actuator vibratory amplitude or phase angle is required to lower the sensed vibration. The controller then sends signals to the actuators to generate the desired force and change in fuselage vibration. These steps are repeated continuously and rapidly adapted during flight to maintain the desired low vibration levels.

While we have illustrated and described a preferred embodiment of our invention, it is understood that this is capable of modification, and therefore do not wish to be limited to the precise details set forth, but desire to avail ourselves of such changes and alterations as fall within the purview of the following claims.

We claim:

1. An aircraft comprising:
   g) a fuselage that defines interior cockpit and cabin sections and an exterior;
   h) at least one housing along the exterior of the fuselage; and
   i) an active vibration control system for limiting fuselage vibration, the system comprising:
      (i) sensor means for sensing the vibration;
      (ii) controller means in signal receiving relation with the sensor means; and
      (iii) actuator means located in the at least one housing, said actuator means being in signal receiving relation with controller means, said actuator being actuated by signals received by said actuator means from said controller as required to cancel a vibratory disturbance having a magnitude within a predetermined range of frequencies and occurring at one of a plurality of predetermined locations in the aircraft fuselage.

2. The aircraft as claimed in claim 1 wherein the aircraft is a helicopter.

3. The aircraft as claimed in claim 1 wherein there are two housings.

4. The aircraft as claimed in claim 1 wherein each of the at least one housing comprises a stub wing.

5. The aircraft as claimed in claim 3 wherein there are two stub wings, one on each side of the fuselage.

6. The aircraft as claimed in claim 1 wherein there are two stub wings, an actuator being located in each stub wing.

7. The aircraft as claimed in claim 1 wherein the active vibration control system sensor means is comprised of a plurality of accelerometers.

8. The aircraft as claimed in claim 3 wherein the sensor means are located in the cockpit and cabin sections.

9. The aircraft as claimed in claim 7 wherein the sensor means is comprised of two accelerometers located in the cockpit section, two accelerometers located in the cabin adjacent to the housings and one accelerometer located in the mid cabin away from the housings.

10. The aircraft as claimed in claim 1 wherein the sensor means comprises a plurality of accelerometers located in the interior cabin.

11. The aircraft as claimed in claim 1 wherein the actuator means is a rotary actuator.

12. The aircraft as claimed in claim 1 wherein the actuator means is comprised of a mass suspended by spring means.

13. The aircraft as claimed in claim 12 wherein the spring means is a plurality of leaf springs.

14. The aircraft as claimed in claim 1 wherein the actuator mass is comprised of a first mass, a second mass, a housing enclosing the masses; and electromagnetic coil substantially surrounding the first and second masses; and first and second spring members respectively joining the first and second masses to the housing.

15. The aircraft as claimed in claim 1 wherein the actuator means provides vibration cancellation at harmonics of the vibratory frequency of the rotor.

16. The aircraft as claimed in claim 1 wherein the actuator means is comprised of a linear actuator.

* * * * *